United States Patent
Sinha et al.

(10) Patent No.: US 10,097,869 B2
(45) Date of Patent: Oct. 9, 2018

(54) METHOD AND SYSTEM FOR EMBEDDING METADATA IN MULTIPLEXED ANALOG VIDEOS BROADCASTED THROUGH DIGITAL BROADCASTING MEDIUM

(75) Inventors: Aniruddha Sinha, Kolkata (IN); Arindam Saha, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 686 days.

(21) Appl. No.: 14/238,728

(22) PCT Filed: Aug. 23, 2012

(86) PCT No.: PCT/IN2012/000562
§ 371 (c)(1),
(2), (4) Date: Feb. 12, 2014

(87) PCT Pub. No.: WO2013/061337
PCT Pub. Date: May 2, 2013

(65) Prior Publication Data
US 2014/0208379 A1    Jul. 24, 2014

(30) Foreign Application Priority Data
Aug. 29, 2011    (IN) .......................... 2422/MUM/2011

(51) Int. Cl.
*H04N 21/236*    (2011.01)
*H04N 7/025*    (2006.01)
*H04N 7/08*    (2006.01)

(52) U.S. Cl.
CPC ....... *H04N 21/23614* (2013.01); *H04N 7/025* (2013.01); *H04N 7/08* (2013.01)

(58) Field of Classification Search
CPC ..... H04N 21/23614; H04N 7/025; H04N 7/08
See application file for complete search history.

(56) References Cited

U.S. PATENT DOCUMENTS 5,461,619 A    10/1995 Citta et al.
6,192,138 B1 *    2/2001 Yamadaji .............. G06T 1/0035
283/113

(Continued)

FOREIGN PATENT DOCUMENTS

GB    2359918    9/2001

OTHER PUBLICATIONS

PCT International Search Report dated Apr. 18, 2013, issued in International Application No. PCT/IN2012/000562 (2 pages).

*Primary Examiner* — Joseph Suh
(74) *Attorney, Agent, or Firm* — Finnegan, Henderson, Farabow, Garrett & Dunner LLP (57) ABSTRACT

The present invention provides a method and system for broadcast of additional content such as metadata required for client specific interactive application in an analog domain along with conventional audio, video and PSI or SI data. The present invention enables transmission of encoded audio data or EPG data, timestamp information required for audio video synchronization referred to as metadata by embedding such metadata in the pixels of video pixels and then encoding by the standard video encoder to generate an encoded stream. The encoded stream is decoded using the standard video decoder at the receiving station to generate a Composite Video Blanking and Sync (CVBS) analog video signal. From the CVBS signal, the RGB or YUV pixels of the videos are extracted. Finally a data extractor module retrieves the embedded metadata from the RGB or YUV pixels.

9 Claims, 4 Drawing Sheets

(56) References Cited

U.S. PATENT DOCUMENTS

| | | | |
|---|---|---|---|
| 6,357,042 B2 | 3/2002 | Anandinivasan et al. | |
| 6,963,590 B1 | 11/2005 | Mann et al. | |
| 6,965,697 B1* | 11/2005 | Kondo | G06T 1/0028 |
| | | | 375/E7.255 |
| 7,334,247 B1* | 2/2008 | Finseth | G06T 1/0021 |
| | | | 725/21 |
| 7,359,450 B1 | 4/2008 | Payne, III et al. | |
| 7,555,768 B2 | 6/2009 | Norman | |
| 8,023,888 B2 | 9/2011 | Santoru et al. | |
| 2002/0056103 A1* | 5/2002 | Gong | H04N 21/23109 |
| | | | 725/39 |
| 2002/0143782 A1* | 10/2002 | Headings | G06F 17/30017 |
| 2003/0025805 A1* | 2/2003 | Yamagishi | G06T 1/005 |
| | | | 348/222.1 |
| 2003/0058257 A1* | 3/2003 | Yin | G06T 1/0064 |
| | | | 345/629 |
| 2003/0103668 A1* | 6/2003 | Kondo | H04N 5/4401 |
| | | | 382/159 |
| 2003/0161016 A1* | 8/2003 | Abhyankar | H04N 1/40012 |
| | | | 358/539 |
| 2003/0196094 A1* | 10/2003 | Hillis | G06F 21/64 |
| | | | 713/179 |
| 2004/0055013 A1* | 3/2004 | Ishioka | H04H 40/18 |
| | | | 725/89 |
| 2004/0057434 A1* | 3/2004 | Poon | H04L 12/56 |
| | | | 370/392 |
| 2004/0177383 A1* | 9/2004 | Martinolich | H04N 21/23892 |
| | | | 725/138 |
| 2005/0234731 A1* | 10/2005 | Sirivara | G10L 19/167 |
| | | | 704/500 |
| 2006/0132839 A1* | 6/2006 | Sitter | H04N 1/00132 |
| | | | 358/1.15 |
| 2006/0197968 A1* | 9/2006 | VanNostrand | G06F 3/1205 |
| | | | 358/1.13 |
| 2006/0241796 A1* | 10/2006 | Messer | G10L 19/167 |
| | | | 700/94 |
| 2007/0003102 A1* | 1/2007 | Fujii | G06T 1/0071 |
| | | | 382/100 |
| 2008/0155627 A1* | 6/2008 | O'Connor | H04N 7/173 |
| | | | 725/109 |
| 2009/0150444 A1* | 6/2009 | Cohen | G06Q 20/1235 |
| 2009/0167750 A1* | 7/2009 | Hong | G09G 3/2096 |
| | | | 345/213 |
| 2009/0252323 A1* | 10/2009 | Cooper | G06F 21/6218 |
| | | | 380/54 |
| 2009/0257485 A1* | 10/2009 | Youn | H04N 19/176 |
| | | | 375/240.01 |
| 2009/0282036 A1* | 11/2009 | Fedtke | G06F 21/6254 |
| 2009/0328088 A1 | 12/2009 | Harris | |
| 2010/0146287 A1* | 6/2010 | Kreiner | H04L 63/12 |
| | | | 713/178 |
| 2011/0088075 A1* | 4/2011 | Eyer | H04N 5/44508 |
| | | | 725/114 |
| 2012/0057715 A1* | 3/2012 | Johnston | G10L 19/008 |
| | | | 381/63 |
| 2012/0219271 A1* | 8/2012 | Vunic | G06K 9/00711 |
| | | | 386/278 |
| 2012/0321273 A1* | 12/2012 | Messmer | G11B 27/031 |
| | | | 386/224 |
| 2012/0330908 A1* | 12/2012 | Stowe | G06F 17/30955 |
| | | | 707/693 |

\* cited by examiner

METHOD AND SYSTEM FOR EMBEDDING METADATA IN MULTIPLEXED ANALOG VIDEOS BROADCASTED THROUGH DIGITAL BROADCASTING MEDIUM

PRIORITY CLAIM

This is a National Stage Entry under 35 U.S.C. § 271 of International Application No. PCT/IN2012/000562, titled "METHOD AND SYSTEM FOR EMBEDDING METADATA IN MULTIPLEXED ANALOG VIDEOS BROADCASTED THROUGH DIGITAL BROADCASTING MEDIUM," filed Aug. 23, 2012, which claims the benefit of India Application No. 2422/MUM/2011, titled "METHOD AND SYSTEM FOR EMBEDDING METADATA IN MULTIPLEXED ANALOG VIDEOS BROADCASTED THROUGH DIGITAL BROADCASTING MEDIUM," filed on Aug. 29, 2011, both of which are incorporated herein in their entirety by reference for all purposes.

FIELD OF THE INVENTION

The invention generally relates to the field of television broadcasting. More particularly, the invention relates to a method and system for embedding metadata in multiplexed videos broadcasted in an analog domain through digital broadcasting medium.

BACKGROUND OF THE INVENTION

Television broadcasting includes broadcasting of conventional video, audio, Program stream information (PSI) and System Information (SI) data etc through broadcasting stations such as satellite, Cable-TV and terrestrial stations. These stations transmit multiple audio-visual contents broadcasted by various broadcasting channels on the television sets located worldwide that displays the contents on TV display screen.

Considering the growth and scope of television broadcasting, there was a need to extend the television viewership to interactive applications. More particularly, there was a need for extending to develop interactive applications on the television such as online gaming, distance-learning and online chatting etc. These applications supported by the television broadcast have resulted in the concept of "Interactive TV".

The significance of "Interactive TV" has been accepted by all the sections of the society including the service providers, the customers and the government agencies. Therefore, there was a need in the art to enable a television broadcasting system that supports interactive applications as desired by the consumer at his or her home using the television as a medium for accessing various interactive applications.

However, as can be observed, the present broadcasting scenario is limited to transmit conventional audio, video, PSI and SI data only. Further, the data type associated with interactive applications may not be enabled to transfer using existing broadcasting infrastructure. Moreover, if the data type is other than the conventional audio, video, PSI and SI data then the data of such data type may not be transmitted using the existing broadcasting infrastructure. Hence, there is a need to enable system for transferring any other data type along with the conventional data type supported for transmission.

In the background art, a PCM Adaptor is known to enable embedding of raw audio data into a video frame. Also, there are systems known in the art embedding teletext and closed captions in the lines of vertical blanking interval (VBI) as disclosed in the CEA-608 standard.

The PCM adaptor as disclosed in the background art is limited to sending raw audio data as video frame and hence is not feasible to transmit data of any other type in the existing broadcasting scenario. Moreover, the audio analog data is not digitally encoded and transmitted through a digital broadcast network. Further, the payload size capacity for the teletext and the closed caption embedded in the VBI lines is very less.

Further, in the background art, there exist various systems to transmit digitally encoded bits in the VBI (vertical blanking interval) wherein, 7175 bits per second per line can be transmitted. However, there is a limit for the number of VBI lines which is of the order of 20-40 lines.

Moreover, at the receiver end, for decoding the embedded data of different types using the existing systems requires the support for specialized hardware devices. The VBI lines contain teletext, closed captions and electronic program guide (EPG). Hence, there is a limit for number of free lines available to send new type of data.

Therefore, as can be appreciated the existing systems and methods in the background art suffers from following limitations:

The existing systems and methods lacks in transmitting data of any data type using existing broadcast infrastructure and limits in supporting few data-types to be transmitted.

The existing systems and methods implemented for transmitting data of any type lacks in transmitting large volume of data using the existing broadcast infrastructures.

The existing systems and methods implemented for transmitting data of any type requires specialized hardware devices for decoding such data at the receiver end.

In view of the above lacunae observed in the background art, there is a long-felt need for a method and system enabling transfer of any type of data in large volume along with the conventional data using existing broadcast infrastructure. More specifically, there is a need in the art for a system and method for transmitting data of any type in a format retrieved by the receiver terminal without any requirement of specialized hardware device.

OBJECT OF THE INVENTION

The principal object of the invention is to enable a method and system for embedding metadata in a video frame transmitted through digital broadcasting medium.

Yet another object of the invention is to enable a method and system for generating data symbols and pilot symbols related to the said metadata.

Yet another object of the invention is to enable a method and system for embedding the generated data and pilot symbols in the video pixels of the video frame to generate data pixels.

Yet another object of the invention is to enable a method and system for extraction of data symbols and video pixels at the receiver.

Still another object of the invention is enabling a method and system for displaying the metadata embedded in the video pixel corresponding to the extracted data symbols and the video pixels as video data on the display screen of the receiver.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The present invention enables a method for transmission and reception of information of any data type using the existing broadcasting infrastructure. The information is transmitted in such format that is easily decoded by the receiving device for display on the screen of the display device along with the video signals.

The present invention enables generation of data symbols for the information to be transmitted along with other video signals. The generated data symbols along with pilot symbols are inserted in the video pixel region of the analog video frame. The pilot symbols are detected by the match filter at the receiving station and accordingly the data symbols are extracted from the video pixels.

The present invention further enables rendering of metadata embedded in the video pixels derived from the extracted data symbols and the videos from the video pixels on the display screen.

The present invention enables a system comprising a content generation module that generates pilot symbols and data symbols representing the metadata to be transmitted along with video data signals. Further, the content generation module embeds the generated pilot and data symbols in the pixel region of video frames to generate data pixels that are multiplexed with video pixels. The multiplexed video pixel is generated and encoded to form a digital transport stream.

At the receiving station, the transport stream is decoded to generate analog CVBS signal. A content extraction module extracts the data symbols and the pilot symbols embedded in the video pixel region along with the video pixels of the videos embedding the data symbols from the CVBS signal. The metadata corresponding to data symbols extracted and the videos corresponding to video pixels are then displayed on the television screen.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and architecture disclosed in the drawings.

DETAILED DESCRIPTION

The description has been presented with reference to an exemplary embodiment of the invention. Persons skilled in the art and technology to which this invention pertains will appreciate that alterations and changes in the described method and system of operation can be practiced without meaningfully departing from the principle, spirit and scope of this invention.

Figure 1:
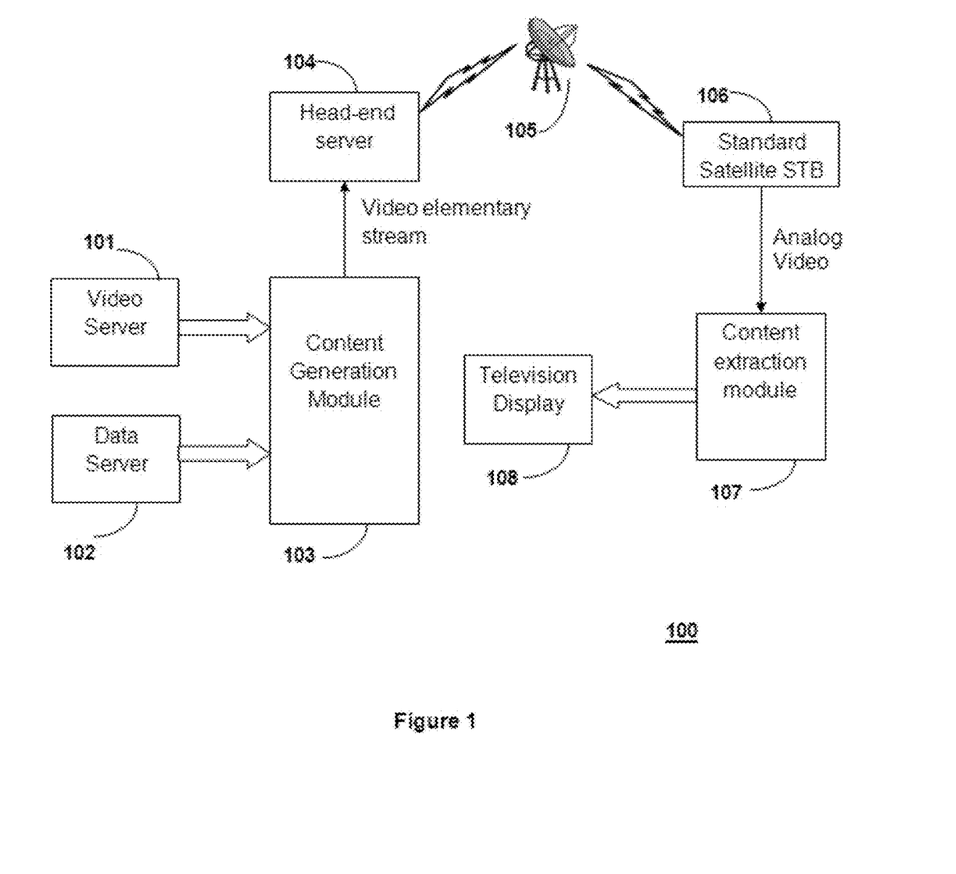
FIG. 1 is a system architecture diagram 100 illustrating various hardware elements enabled to broadcast any type of information using existing broadcast infrastructure in accordance to an exemplary embodiment of the invention.

Referring to FIG. 1 is a system architecture diagram 100 illustrating various hardware elements performing the task of broadcasting any type of data using existing broadcast infrastructure in accordance to an exemplary embodiment of the invention.

In an exemplary embodiment, as illustrated in FIG. 1, the system architecture 100 comprises a video server 101 storing plurality of videos and a data server 102 storing data used for interactive television applications referred to herein as metadata collectively to be transmitted using existing digital broadcast infrastructure.

Further, the system comprises a content generation module 103, a head-end server 104, and a broadcasting station 105 as illustrated in FIG. 1. In this embodiment, the said broadcasting station is illustrated as a satellite broadcasting station. However, in alternative embodiments, the broadcasting station may be a cable-TV broadcasting station, a terrestrial broadcasting station or combinations thereof.

As illustrated in FIG. 1, at a receiving station, a standard satellite set-top-box (STB) 106 is shown receiving the videos and data transmitted by the broadcasting station. Further, a content extraction module 107 is shown coupled to the STB performing the task of extracting the videos and the data to be displayed on the display screen of the television 108 in accordance to the exemplary embodiment. In alternative embodiments, the content extraction module 107 may display the videos and data on the display or monitor screen of a computer, a laptop, a mobile phone, Smartphone or combinations thereof.

According to an exemplary embodiment, the videos captured and stored at the video servers are in analog domain. These multiple videos may be carried by multiple broadcasting channels. The analog video frames are multiplexed in spatial and temporal domain to transmit multiple videos through one or two broadcasting channels as disclosed in the patent application 1894/MUM/2011.

According to an exemplary embodiment, the present invention enables transmission of any other data required for interactive applications such as the metadata to be displayed on the television along with the analog videos broadcasted by multiple broadcasting channels. In order to facilitate this, the metadata representing information of any data type that is required for interactive applications, more specifically for "Interactive TV" purposes is embedded into multiple analog video frames in a format that is decoded by the STB receiver at the receiving station to display on the television display.

In an exemplary embodiment, such metadata stored in data server 102 is transferred as text data or binary data. Further, the binary or text data is inserted in the video frames in a format that is generated by the said content extraction module 103 in such a way that it is able to be extracted by the content extract module 107 at the receiving station to be displayed on the television screen 108.

In an exemplary embodiment, the content generation module 103 generates data and pilot symbols and then inserts the generated pilot symbols followed by the data symbols in the video frames carrying the analog videos to be transmitted through digital broadcasting medium.

Figure 2:
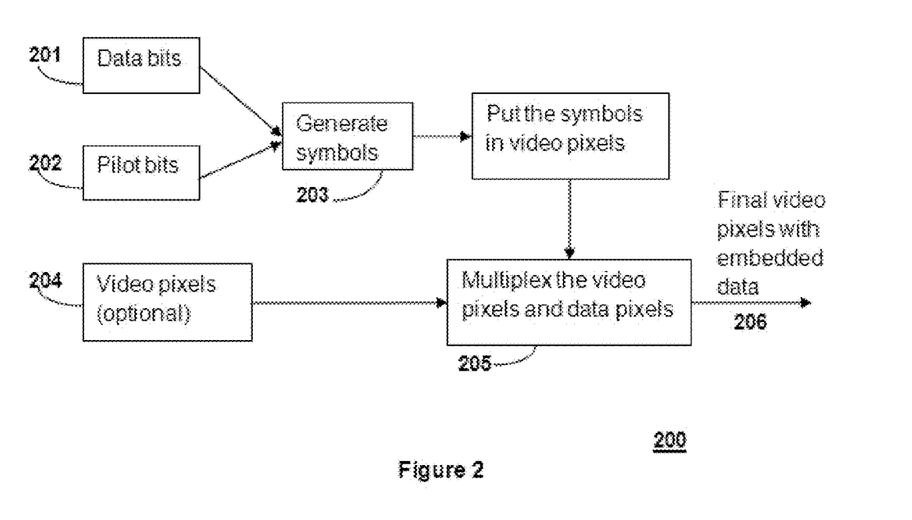
FIG. 2 is a block diagram 200 illustrating generation of data symbols and embedding of the said symbols in video pixels in accordance to an exemplary embodiment of the invention.

According to an exemplary embodiment of the present invention, the generation and insertion of data and pilot symbols is implemented as illustrated in FIG. 2.

As illustrated in FIG. 2, the metadata referring to data required for broadcast of interactive applications on television is transmitted in the form of data bits 201. Further, pilot bits 202 are used as reference bits that are used for identification of the data bits 201 to be transmitted.

According to an exemplary embodiment, each of the data bits 201 and the pilot bits 202 are first converted into data symbols 203. The data symbols 203 generated are then inserted in the pixel region of the analog videos to form data pixels. The analog videos comprise plurality of video pixels. Therefore, few of the plurality of video pixels in each of the analog videos are utilized for embedding the generated data symbols 203. More specifically, the data symbols are embedded in the 'Y' and/or 'U' and/or 'V' component of the each of the video pixels of the said analog videos. Further, as illustrated in FIG. 2, the remaining video pixels 204 of the multiple analog videos to be broadcasted are multiplexed with the formed data pixels using a multiplexer 205 implemented in the content extraction module to generate multiplexed video frames 206 comprising video pixels with embedded metadata.

Figure 4:
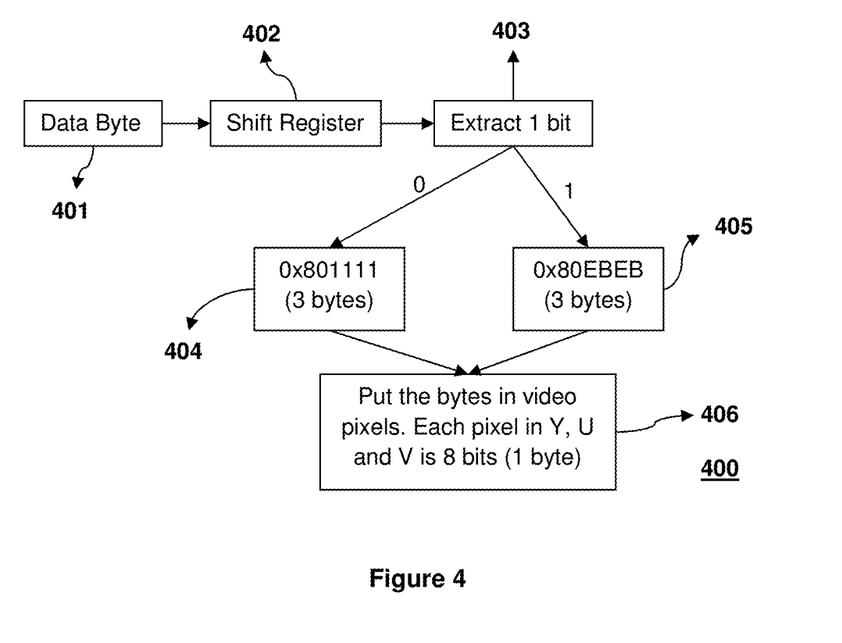
FIG. 4 is a block diagram 400 illustrating the generation of the data symbols and embedding them in the video pixels of the analog video frames in accordance to an exemplary embodiment of the invention.

Referring to FIG. 4 is a block diagram 400 illustrating the generation of the data symbols and embedding in the video pixel in accordance to an exemplary embodiment of the invention. In this exemplary embodiment, a 3 byte symbol is generated for each 1 bit of data. However, in an alternative embodiment of the invention, N byte symbol can be generated for each one bit of data, where N is an integer or fraction.

As illustrated in FIG. 4, a data byte 401 indicating metadata to be transferred is shifted using shift register 402 to extract one bit data 403. In the embodiment of the present invention, if the data bit 403 extracted is '0', then a data symbol 0x801111 404 is generated containing three byte data. On the other hand, if the data bit extracted 403 is '1', then a data symbol 0x80EBEB 405 is generated.

Further, as illustrated in FIG. 4, the generated data symbols 404 and 405 are inserted in the video pixel region 406 of the analog video frames. In this embodiment, the data symbols are embedded in the Y, U and V component of the video pixel region. Each of the video pixels in Y, U and V is of 8 bits or 1 byte size.

Now, referring to FIG. 1, the metadata inserted multiplexed video frames generated are encoded using any of the standard video encoders such as MPEG2, MPEG4, and H264 etc or combinations thereof as known in the art. The video encoder encoding the multiplexed video frames may be implemented in the content generation module 103. Thus, the output of the content generation module 103 contains a digital video elementary stream comprising the encoded video frames containing video pixels with embedded metadata as data symbols.

As illustrated in FIG. 1, the head-end server 104 receives the digital video elementary stream for further processing and implementing head-end functionalities. The head-end server 104 comprises a transport stream generation module that generates a digital transport stream comprising various analog video frames multiplexed in spatial and temporal domain captured from different video servers, wherein the video pixel region of the said analog video frames comprises data related to interactive television applications captured from different data servers as illustrated in FIG. 1.

Further, the generated transport stream is transmitted through the digital broadcasting medium. Thus, the invention enables transmission of multiplexed video frames in an analog domain with embedded metadata through existing digital broadcasting structure without any requirement of specialized hardware circuits. As illustrated, the transport stream is transmitted to the receiving station using the satellite broadcasting antenna 105 acting as the broadcasting station.

The transport stream is received by the standard satellite set-top-box (STB) 106 implemented at the receiving station as illustrated in FIG. 1. The STB 106 comprises a video decoder that decodes the received transport stream to generate the video pixels from the stream. Further, the STB is configured to generate the Composite Video Blanking and Sync (CVBS) analog video signal from the decoded video pixels from the transport stream.

Figure 3:
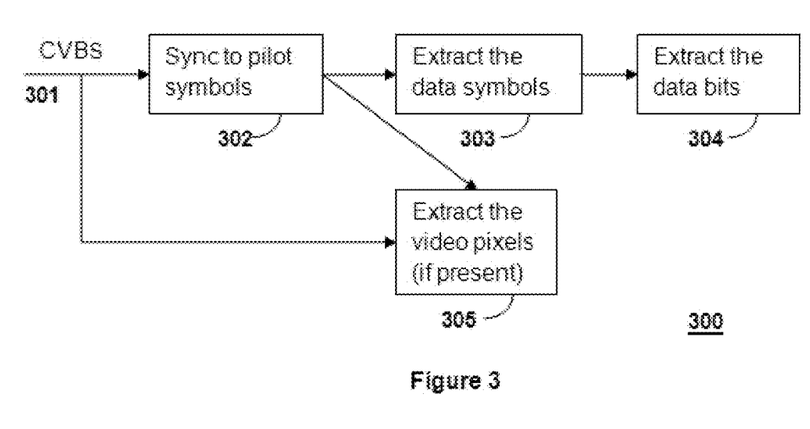
FIG. 3 is a block diagram 300 illustrating extraction of data symbols and video pixels to display video and metadata in accordance to an exemplary embodiment of the invention.

The CVBS video signal is further received by the content extraction module 107 as illustrated in FIG. 1. The task of the content extraction module 107 is to extract the embedded data symbols from the video pixel region of the analog video frames. FIG. 3 illustrates extraction of the video pixels with data bits from the CVBS analog video signal in accordance to an exemplary embodiment of the present invention.

As illustrated in FIG. 3, the CVBS analog video signal 301 is received at a matched filter implemented in the content extraction module 107 illustrated in the FIG. 1. The function of the match filter is to extract the pilot symbols from the video signal for identifying the data symbols representing the metadata to be displayed.

In an exemplary embodiment, the extraction of pilot pattern is implemented by using a matched filter. The matched filter is designed using the similar pilot symbols pattern inserted while generating the symbols.

The content extraction module 107, after capturing a video frame from the CVBS analog video signal derives a threshold value of detecting pilot pattern for that particular frame using auto correlation value of similar pilot symbol pattern generated for that particular video frame with zero shifts.

In an exemplary embodiment, threshold value is determined to be 80% of the auto correlation value of the pilot symbols. Further, the correlation values between the matched filter and the received data from the captured frame are collected at the content extraction module. In an exemplary embodiment, if the position provides that the maximum values of correlation are greater than the threshold value then that position is determined as the starting location of pilot pattern. Further, a sharp peak in correlation value is observed that detects the pilot symbols pattern.

Now, again referring to FIG. 3, as illustrated, as-soon-as the pilot symbols 302 are detected from the analog video CVBS signal 301, the corresponding data symbols 303 following the pilot symbols 302 representing metadata for interactive applications are extracted by the content extraction module 107 illustrated in FIG. 1. Further, as illustrated in FIG. 3, the data bits 304 corresponding to data symbols 303 are extracted. Also, the video pixels 305 corresponding different analog videos multiplexed by different broadcasting channels are extracted from the analog video CVBS signal 301.

In an exemplary embodiment, the metadata corresponding to the extracted data bits 304 and the analog videos corresponding to extracted video pixels 304 are rendered on the display screen of the television 108 coupled to the said content extraction module 107 as illustrated in FIG. 1.

Thus, the present invention enables to generate content for broadcast with not only conventional audio, video and PSI (Program-specific information) or SI data but also any type of data that is required for client for specific application, more particularly for "Interactive TV" applications in the analog domain. The present invention can support transmit of even encoded audio data or EPG data, or some timestamp information for audio video synchronization or some metadata information to create an interactive client etc using the existing digital broadcast infrastructure.

BEST ENABLED MODE

Consider a distance-learning education environment realized in accordance to an exemplary embodiment of the present invention. In the distant learning environment, the tutorials are in the form of audio visual contents and are need to be broadcasted with the support of local language and curriculum guidelines.

In an exemplary embodiment, consider the analog videos to be transmitted through represent tutorial videos in the distance learning scenario. Let the QA (Question-Answer) series related to the tutorial videos represent the metadata to be embedded in the video pixel region of the videos.

In an exemplary embodiment of the present invention, the first task is to generate pilot and data symbols for the metadata to be transmitted along with the video frames of the tutorials. The metadata to be transmitted is in the form of hexadecimal format or data bits.

Each of the data bits are initially converted into data symbols. The data symbol length is of three bytes and is represented as: A symbol representing data bit 0 is X00 and a symbol representing data bit 1 is X11, wherein the value of X is equivalent to 0.5. In this manner, the pilot and data symbols are generated.

The next task is to embed the generated pilot and data symbols in the video pixel region of each of the video frames. In an exemplary embodiment, the symbols are embedded in the 'Y' component (luminance) of the video pixel region. The maximum value of Y is 0xEB and represented as data bit 0 while the minimum value of Y is 0x11 represented as data bit 1. Also, in this embodiment, the center value of Y is represented as X having value 0x80.

Considering the above Y values, the data symbols generated for data bits 0 and 1 are represented as 0x80EBEB and 0x801111 respectively, both of 3 bytes in length. In an alternative embodiment, the generation of symbols can be implemented wherein a symbol can be of two byte in length containing bit information representing data to be transmitted.

In an exemplary embodiment, consider a pilot pattern to be embedded in the video pixel comprises 48 bits representing the start of actual metadata embedded in the video pixel region of the video frame. Let the metadata representing QA series is inserted between $51^{st}$ pixel and $670^{th}$ pixel in a line of the video frame. Now, as each bit is implemented as three byte symbols, the pilot pattern symbols are inserted between $51^{st}$ and $194^{th}$ pixel. In an exemplary embodiment, the possible pilot pattern symbols embedded in the pixel video region may be as follows:
101010101100111000111100001111000111001101010101
OR
000011110001110011010101010101001100011100001111

In an exemplary embodiment, after the pilot symbols are embedded the audio data for the tutorial representing QA series are embedded as data symbols in the video frames. The audio data is inserted as part of each frame. The pilot symbols in each of the frames is followed by a frame number (8-bit), a tutorial ID (32-bits) and the payload length (16-bit) indicating audio data symbols to be followed after the tutorial ID. These data is then followed by audio symbols referred herein as metadata of the tutorials embedded in each of the video frames.

In an exemplary embodiment, for one second of audio data for one tutorial, the length of data is approximately 5000 bits for one language. Therefore, the audio symbols embedded are around 5000 symbols those occupy 15000 video pixels in the video frame. If the audio data is inserted only in alternate lines, then it will occupy 50 lines approximately. The lines to be inserted is altered every frame if used in successive frames.

In accordance to preferred embodiment of the present invention, the embedding of audio symbols is implemented as follows:

Frame number having audio is $=1+3*I+J$, where I is the tutorial ID and J is the language ID.

Further, assuming $0<8<=1$ and $0<J<=1$, then the frame numbers 1, 4, 7, 10, 13, 16, 19 and 22 contains all the 8 tutorials for one language. Note that frame number 0 is the special frame and length of GOP is 25.

The tutorial video frames along with special frame carrying audio symbols are then transmitted by the broadcasting station to the receiving station. On the receiver station, the content extraction module extracts the audio symbols embedded in the tutorial video frames and the tutorial video pixels to be displayed on the display screen of the television. At the receiver end, the video frame is retrieved from the decoded transport stream to generate a CVBS video signal.

The payload field in the video frame indicates the presence of audio data symbols embedded in the video frame. Then, the pilot symbols patterns are extracted followed by the extraction of the audio data symbols following the pilot symbols in the video frame. Then, the extraction module extracts the video pixels of the tutorial videos from the CVBS signal.

Finally, the tutorial videos and the metadata extracted are rendered on the display screen of the television.

ADVANTAGES OF THE INVENTION

The present invention has following advantages:
- The present invention enables to transmit any type of client specific information in large volume, as part of the analog video frame, utilized for different purpose of user interactive applications using the existing broadcasted medium.
- The present invention does not require any specialized hardware for enabling transfer of data of any type using existing broadcast infrastructures.
- The present invention enables transmitting multiple videos with embedded metadata through available channel bandwidth at the transmitting station by multiplexing the said videos and metadata in a spatial and temporal domain.

The invention claimed is:
1. A system for embedding metadata in at least one analog video frame, the system comprising:
a processor; and
a memory coupled to the processor, wherein the processor is capable of executing instructions stored in the memory to:

generate at least one data symbol representing the metadata based on at least one data bit and at least one pilot bit, the at least one data bit and the at least one pilot bit being associated with the metadata, wherein the at least one pilot bit is used as a reference bit for identification of the at least one data bit to be transmitted, wherein the at least one pilot bit is converted into at least one pilot symbol and the at least one data bit is converted into the at least one data symbol;

embed the at least one data symbol with the at least one pilot symbol into at least one first set of video pixels corresponding to a video pixel region of the at least one analog video frame to generate at least one set of data pixels; and multiplex the at least one set of data pixels with at least one second set of video pixels representing non-embedded metadata pixels in the at least one analog video frame to generate at least one set of multiplexed video pixels.

2. The system of claim 1, wherein the metadata comprises at least one of: encoded audio data, timestamp information related to audio-video synchronization associated with the at least one analog video frame, or Electronic Program Guide (EPG) data.

3. The system of claim 1, further comprising a video encoder configured to encode the at least one set of multiplexed video pixels to generate a video elementary stream.

4. The system of claim 3, further comprising a head-end server configured to:
generate a digital transport stream based on the video elementary stream; and
transmit the digital transport stream via a digital broadcasting medium.

5. A method for embedding metadata in at least one analog video frame, the method comprising:
providing at least one data bit and at least one pilot bit associated with the metadata;
generating at least one data symbol representing the metadata based on the at least one data bit and the at least one pilot bit, wherein the at least one pilot bit is used as a reference bit for identification of the at least one data bit to be transmitted, wherein the at least one pilot bit is converted into at least one pilot symbol and the at least one data bit is converted into the at least one data symbol;
embedding the at least one data symbol with the at least one pilot symbol into at least one first set of video pixels corresponding to a video pixel region of the at least one analog video frame to generate at least one set of data pixels; and
multiplexing the at least one set of data pixels with at least one second set of video pixels representing non-embedded metadata pixels in the at least one analog video frame to generate at least one set of multiplexed video pixels.

6. The method of claim 5, wherein the at least one pilot symbol represents a starting position of the embedded metadata to be transmitted.

7. The method of claim 5, wherein embedding the at least one data symbol and the at least one pilot symbol comprises embedding the at least one data symbol and the at least one pilot symbol into at least one of a Y component, a U component, or a V component of the video pixel region in the at least one analog video frame.

8. The method of claim 5, further comprising:
encoding the at least one multiplexed video pixels to generate a video elementary stream;
generating a digital transport stream based on the video elementary stream; and
transmitting the digital transport stream via a digital broadcasting medium.

9. The method of claim 5, wherein the metadata comprises at least one of: encoded audio data, timestamp information related to audio-video synchronization associated with the at least one analog video frame, or Electronic Program Guide (EPG) data.

* * * * *